United States Patent [19]

Breitscheidel et al.

[11] Patent Number: 4,882,208
[45] Date of Patent: Nov. 21, 1989

[54] MULTILAYER COMPOSITE SHEET, ESPECIALLY FOR USE AS A PADDING LAYER UNDER ARTIFICIAL GRASS

[75] Inventors: Hans-Ulrich Breitscheidel, Siegburg; Rudolf Kautz, Hennef; Karl-Heinz Sandermann, Lemgo, all of Fed. Rep. of Germany

[73] Assignees: Huels Troisdorf AG, Troisdorf; Balsam Sportstattenbau & Co. KG, Steinhagen, both of Fed. Rep. of Germany

[21] Appl. No.: 199,144

[22] Filed: May 26, 1988

[30] Foreign Application Priority Data

May 27, 1987 [DE] Fed. Rep. of Germany ....... 3717880

[51] Int. Cl.⁴ .......................... B32B 3/02; B32B 33/00
[52] U.S. Cl. ........................................ 428/17; 156/72; 428/95; 428/314.4; 428/314.8; 428/318.6; 428/319.1; 428/319.9; 428/461; 428/464; 428/516

[58] Field of Search ................. 428/17, 95, 137, 314.4, 428/314.8, 318.6, 319.1, 319.9, 461, 464, 516; 156/72

[56] References Cited

U.S. PATENT DOCUMENTS 4,489,115 12/1984 Layman et al. ...................... 428/62

Primary Examiner—Marion C. McCamish
Attorney, Agent, or Firm—Antonelli, Terry & Wands

[57] ABSTRACT

A multilayer composite sheet, especially for use as a padding layer underneath artificial grass, or turf includes a bottom layer of expanded synthetic resin, particularly of closed-cell polyethylene foam, and a metallic foil flatly bonded to the foam material. The multilayer composite sheet exhibits low weight per unit area, low water absorption, and low thermal linear expansion suitable for exposure to ambient weather conditions especially sunlight.

10 Claims, 1 Drawing Sheet

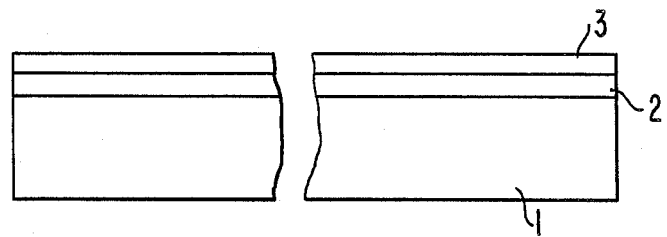

MULTILAYER COMPOSITE SHEET, ESPECIALLY FOR USE AS A PADDING LAYER UNDER ARTIFICIAL GRASS

This invention relates to a multilayer composite sheet, especially for use as a padding layer under an artificial grass or turf.

Artificial turf is utilized to an increasing extent as a long-wearing surface for athletic facilities exposed to the weather. In order to avoid injury to athletes, it is customary to place a cushioning layer underneath the artificial turf. Heretofore, padding layers that have been used are, for example, panels or sheets of rubber shreds (recycling material) or polyurethane foam materials. The utilization of compact materials, such as press-molded shredded rubber, is disadvantageous on account of the high weight per unit area; whereas the use of polyurethane foams has the drawback of the high water absorbency of this material.

In order to overcome these disadvantages, it has been suggested to use sheets or panels of polyethylene foam as the padding underneath artificial grass (US-PS 4,489,115). Polyethylene foam material expands to a considerable extend when exposed to sunlight, due to its high coefficient of thermal expansion of about $350 \times 10^{-6}$ $K^{-1}$. In the customary laying of padding underneath artificial grass wherein a sheet of padding material having a length of up to 50 m is placed on the ground without fastening and then is covered by the artificial grass without further fixing in place, a polyethylene foam padding layer, when heated under solar radiation by 35° C., would undergo a dimensional change of about 0.6 m. Thereby, a wavy effect arises which, due to the low weight per unit area of polyethylene foam, considerably impedes laying of the artificial lawn when a wind is blowing. Restretching of the sheet expanded by the action of heat would have the result that shrinking stresses occur during cooling which can bring about distortions and/or compression folds in the artificial lawn.

Therefore, the invention is based on the object of providing a padding layer for use under artificial grass which layer, with low weight per unit area, has low water absorbency and can be installed at low expense.

The invention attains the object by a multilayer composite sheet characterized by a lower layer of expanded synthetic resin and an upper layer of metallic foil or metallic layer flatly bonded to the lower layer.

An essential feature of the invention resides in reducing the linear expansion of the padding layer by providing the foamed synthetic resin with a heat-reflecting metal or metal foil layer. An especially suitable foamed synthetic resin has proved to be crosslinked closed-cell polyethylene foam material with a gross density of 30–150 kg/m$^3$, in particular of 50–100 kg/m$^3$. The term "polyethylene foam material" is understood to mean in accordance with this invention, physically or chemically crosslinked foams based on polyethylene, copolymers of ethylene with other monomers, mixtures of polyethylene and/or ethylene copolymers. Polyethylene foam having a thickness of 5–20 mm, especially 8–12 mm, is used with preference.

Polyethylene foam material can be laminated to metallic foils, e.g. aluminum foil, only with high technical expenditure. According to an advantageous embodiment of this invention, it is proposed therefore, to laminate the expanded synthetic resin to a paper coated with metallic foil, especially aluminum-coated kraft paper. Cellulose material, such as kraft paper, can be laminated with high adhesive strength to polyethylene foam by flame lamination, known to those skilled in the art, without the use of adhesives or adhesion promoters.

A further preferred embodiment of the invention is the lamination of foam material with plastic sheet from non-crosslinked polyolefin coated with metallic foil, at which the foam material preferably is from polyethylene. Such a composition from crosslinked polyethylene foam material and the non-crosslinked polyethylene sheet easily can be made by flame lamination.

In flame laminating, the polyethylene foam sheet is heated on the surface to a temperature of about 180–[300° C]., especialy with an open flame, so that the heated surface becomes tacky, and the sheet is joined under pressure with the sheet of cellulose material in a roll nip.

It has been found surprisingly that the composite sheet according to this invention, comprising a foamed synethetic resin and a metallic foil, not only exhibits a lesser temperature increase when exposed to solar radiation, due to reflection of infrared radiation, but also has a considerably lower linear expansion at a given temperature increase. This is so because the metal foil is capable of absorbing considerable tensile stresses and thus of reducing thermal expansion of the composite sheet. When using an additional kraft paper layer as the central ply, thermal linear expansion is further diminished.

Especially suitable for use as a proper ply is a kraft paper having a weight per unit areas of 30–60 g/m$^2$ glue-laminated with an aluminum foil having a thickness of 5–15 μm.

The preferably employed closed-cell polyethylene foam is extensively water-impermeable. When using the multilayer composite sheet of this invention in the open air, the provision is made, therefore, to perforate the entire sheet, for example by means of a porcupine roller, to permit drainage of water (rain). The perforation can be performed, for example, by producing holes having a diameter of 3–15 mm, the holes having a mutual spacing of 20–200 mm. In spite of this perforation, the polyethylene foam employed with absorb hardly any water.

The invention will be described hereinbelow with reference to a practical example and a comparative example, as well as the accompanying DRAWING.

1. COMPARATIVE EXAMPLE

A panel (trade name: "TROCELLEN" 5010 P by Huels Troisdorf AG firm) of crosslinked, closed-cell polyethylene foam having a gross density of 50 kg/m$^3$, a thickness of 10 mm, and a length of 450 mm was exposed for 30 minutes to medium-wave infrared radiation. The ends of the foam panel were fixed in place to prevent linear expansion. The ambient temperature was 20° C. At the beginning of the test, the panel lay flatly on a fiberboard support. After 30 minutes, the following values were measured: temperature within about 1 mm below the foam surface, temperature on the foam underside, and maximum surface distortion height between support and the bottom edge of the test specimen.

2. EXAMPLE

In accordance with the test conditions of Example 1, a composite material according to this invention of a polyethylene foam (same type as in Example 1) with an upper layer lamination of kraft paper (40 g/m$^2$) and an aluminum foil having a thickness of 7 μm was exposed to the same conditions.

3. EXAMPLE

In accordance with the test conditions of Example 1, a composite material according to this invention of a polyethylene foam (same type as in Example (1) with a lamination of polyethylene sheet (LDPE) having a thickness of 15 μm and an aluminum foil having a thickness of 18 μm was exposed to the same conditions.

The following table contains a comparison of the test results.

Result:

| | Example | Temp. About 1 mm Below top surface | Temp. on underside | Surface Distortion Height |
|---|---|---|---|---|
| 1. | "TROCELLEN" 5010 P anthracite untreated | 70° C. | 36° C. | 25 mm |
| 2. | As (1), laminated with aluminum/ paper 7 μm/ 40 g/m² | 42° C. | 27° C. | 0 |
| 3. | As (1), laminated with aluminum/LDPE 18μm / 15 μm | 44° C. | 28° | 0 |

The results show that thermal expansion is practically entirely precluded by the use of a layer of paper and metal foil flatly bonded to the foamed synthetic resin.

An examination of the multilayer composite sheet according to the invention in a comparison with an unlaminated polyethylene foam sheet, in each case with a length of 50 m, showed a dimensional change of the unlaminated sheet upon exposure to strong sunlight of 0.6 m, and of the sheet according to this invention of 30 mm. The change in length of the multilayer composite sheet of this invention thus amounted to only about 5% of the linear expansion of an unlaminated polyethylene foam sheet.

The accompanying figure shows the composite sheet of this invention, consisting of the polyethylene foam sheet 1, a layer of kraft paper 2, and an aluminum foil 3.

The composite sheet (the Figure) according to the invention exhibits low weight per unit area, low water absorption and low thermal linear expansion.

What is claimed is:

1. A multilayer composite sheet for use as a padding layer underneath an artificial grass layer which comprises a bottom layer of closed-cell crosslinked polyethylene foam material and an upper layer of a metallic layer; said upper layer being bonded to the bottom layer via an intermediate layer.

2. A multilayer composite sheet according to claim 1, wherein the intermediate layer is one of a cellulosic material layer and a non-crosslinked polyethylene layer.

3. A multilayer composite sheet according to claim 2, wherein the metallic layer is an aluminum foil having a thickness of 5–15 μm and said intermediate layer comprises a kraft paper having a weight per unit area of 30–60 g/m².

4. A multilayer composite sheet according to claim 3, wherein the kraft paper is laminated with the polyethylene foam material by flame lamination and is laminated to the aluminum foil with an adhesive.

5. A multilayer composite sheet according to claim 1, wherein said closed-cell crosslinked polyethylene foam material has a gross density of 30–150 kg/m³.

6. A multilayer composite sheet according to claim 1, wherein the foam material has a thickness of 5–20 mm.

7. A multilayer composite sheet according to claim 1, wherein the metallic layer is an aluminum foil having a thickness of 5–30 μm and said intermediate layer is a non-crosslinked polyethylene sheet having a thickness of 10–30 -m.

8. A multilayer composite sheet according to claim 1, wherein the sheet is perforated with a plurality of holes to promote drainage of water therethrough.

9. A process for cushioning an artificial grass layer which comprises placing a multilayer composite sheet comprising a bottom layer of closed-cell crosslinked polyethylene foam and a layer of a heat-reflective metallic layer bonded to the bottom layer via an intermediate layer underneath an artificial grass layer exposed to ambient weather conditions of heat and light; said layer of a heat-reflective metallic layer being positioned between the bottom layer and the artificial grass layer.

10. A process for cushioning an artificial grass layer, further comprising positioning the multilayer composite sheet so that the layer of heat-reflective metallic layer supports the artificial grass layer.

* * * * *